United States Patent
Campbell et al.

[11] Patent Number: 5,665,321
[45] Date of Patent: Sep. 9, 1997

[54] PROCESS FOR THE REACTION AND ABSORPTION OF GASEOUS AIR POLLUTANTS, APPARATUS THEREFOR AND METHOD OF MAKING SAME

[75] Inventors: Larry E. Campbell, Louisville, Tenn.; Robert Danziger, Los Angeles; Eugene D. Guth, Torrance, both of Calif.; Sally Padron, Knoxville, Tenn.

[73] Assignee: Goal Line Environmental Technologies, Los Angeles, Calif.

[21] Appl. No.: 489,987

[22] Filed: Jun. 12, 1995

Related U.S. Application Data

[62] Division of Ser. No. 192,003, Feb. 4, 1994, Pat. No. 5,451,558.

[51] Int. Cl.$^6$ ................ B01D 53/74; B01D 53/86
[52] U.S. Cl. ............ 423/210; 423/239.1; 423/244.1; 423/247
[58] Field of Search .............. 423/244.1, 239.1, 423/247, 210

[56] References Cited

U.S. PATENT DOCUMENTS

| | | | |
|---|---|---|---|
| 3,565,574 | 2/1971 | Kearby et al. | 423/247 |
| 4,105,744 | 8/1978 | Erdoess et al. | 423/239 |
| 4,308,233 | 12/1981 | Narumiya et al. | 422/169 |
| 4,426,365 | 1/1984 | Magder | 423/239 |
| 4,604,275 | 8/1986 | Murib | 423/437 |
| 5,051,391 | 9/1991 | Tomisawa et al. | 502/242 |
| 5,061,464 | 10/1991 | Cordonna et al. | 423/213.5 |
| 5,106,802 | 4/1992 | Horiuchi et al. | 502/65 |
| 5,254,519 | 10/1993 | Wan et al | 502/252 |

FOREIGN PATENT DOCUMENTS

| | | | |
|---|---|---|---|
| 56-111025 | 9/1981 | Japan . | |
| 3-131320 | 6/1991 | Japan . | |
| 6165920 | 6/1994 | Japan | 423/239.1 |
| WO9404258 | 3/1994 | WIPO . | |

*Primary Examiner*—Gary P. Straub
*Assistant Examiner*—Timothy C. Vanoy
*Attorney, Agent, or Firm*—Kenneth H. Johnson

[57] ABSTRACT

A method of decreasing the level of NOx, CO and $SO_2$ emissions in a gas turbine is disclosed. A catalyst absorber, preferably made of alumina/platinum/carbonate salt, is used to oxidize the pollutant oxides and absorb them. The catalyst absorber can then be regenerated and reused. An apparatus for treating the stack gases, and a method of making the catalyst absorber are also described.

44 Claims, 4 Drawing Sheets

PROCESS FOR THE REACTION AND ABSORPTION OF GASEOUS AIR POLLUTANTS, APPARATUS THEREFOR AND METHOD OF MAKING SAME

This is a division of application Ser. No. 08/192,003, filed Feb. 4, 1994, now U.S. Pat. No. 5,451,558.

BACKGROUND OF THE INVENTION

1. Field of the Invention

The present invention relates to a process for reducing gaseous pollutants in the air, namely nitrogen oxides (NOx), sulfur oxides and/or carbon monoxide (CO), which are produced by combustion of hydrocarbons or hydrogen in an engine or boiler, and primarily, in a gas turbine. The present invention is also directed to an apparatus for performing the process and a process for making the reactor/catalyst absorber.

2. Art Background

Turbine power plants are becoming the standard for generating electricity because they are so efficient compared to any other form of power manufacture. Turbine power plants that burn methane to produce power for residents and manufacturing facilities in cities also produce carbon monoxide and nitrogen oxide as pollutants. It is highly desirable to reduce or eliminate these pollutants so that the air is not contaminated as a result of power production.

Initially, the permitted level of pollution by power plants for nitrogen oxides (NOx), which includes nitric oxide, (NO) and nitrogen dioxide ($NO_2$), was less than 100 parts-per-million (ppm) and the level of carbon monoxide (CO) was to a level of less than 100 ppm. Later, a second step was taken to reduce the NOx to less than 25 ppm and the CO today is still permitted at any amount less than 100 ppm. Using current technology, the output levels of NOx can be reduced to the range of 5 to 9 ppm plus $NH_3$ slippage resulting from the selective catalytic reduction (SCR) technology described below.

The only technology which is currently available to obtain the 5-9 ppm NOx levels is called selective catalytic reduction, in which ammonia is mixed with the flue gas and then passed over a catalyst which selectively combines the nitrogen oxides and ammonia to eliminate a major portion of the NOx. One problem with the selective catalytic reduction is that as a practical matter, it is only capable of reducing the NOx to the range of 5 to 9 ppm. Another problem, referred to as slippage, is caused by hazardous ammonia passing through the catalyst.

Another problem of the SCR technology is that the operating conditions required for SCR are only achieved by expensive modifications of the down stream boiler or heat exchanger system.

There have been other technologies for reduction of pollution which have been advanced, such as overwatering in the combustor, and these also have the potential to reduce the NOx pollution, but none of them reduce the NOx to levels much less than 5 to 9 ppm.

In a copending application owned by the assignee of the present application, a system comprising essentially a two step process has been described. In the first step, the stack gases are first contacted with a catalyst under certain conditions which cause the oxidation of certain oxide pollutants, including NO and CO. In the second step, the oxidized pollutants are absorbed in an absorption bed.

It would be desirable to combine the oxidation and absorption steps into a single step performed by a single material.

SUMMARY OF THE INVENTION

The present invention has the capability of reducing hydrocarbon burning engine waste pollutants, and particularly those from a gas turbine, including nitrogen oxide, carbon monoxide and sulfur oxides. The invention, as described in more detail below, includes a novel catalytic absorber and method of making the absorber, a novel process and apparatus capable of reducing air pollutants and the method of making the apparatus.

The pollutants from a turbine in a power generating stack are primarily present as NO. The process of the present invention causes oxidation of the NO to $NO_2$. This produces $NO_2$ from substantially all of the nitrogen oxides (NO). $NO_2$ is a much more active material and can be and is absorbed readily by the catalytic absorber from the gas stream even when present at low concentrations in the ppm range.

The turbine exhaust gases are initially at about 1000° F. after the shaft energy has been withdrawn from them. These gases are then passed over heat exchangers to remove energy and produce steam while cooling the exhaust or stack gases. Stack gases are moving at high velocity depending upon the diameter of the stack, and after heat is removed, the stack gases typically are in the range of 250° to 500° F. and travel about 30-50 feet per second. The gas contains 13-15% oxygen, up to about 12% water, and about 4% carbon dioxide. This is in addition to the pollutants, which are the NOx mixed with approximately 90% NO and 10% $NO_2$, CO in the range of 30 to 200 ppm and sulfur dioxide ($SO_2$) in the range of about 0.2 to 2.0 ppm when natural gas is the fuel.

The present invention involves a one step/one element process and apparatus to remove the nitrogen oxides, carbon monoxide, and sulfur oxides from the stack gases. Using a combined catalyst/absorber, the nitrogen oxides are oxidized to nitrogen dioxide; the carbon monoxides are oxidized to carbon dioxide, and the sulfur dioxide ($SO_2$) is oxidized to sulfur trioxide ($SO_3$). This oxidation occurs at temperatures in the range of 150° to about 425° F., and more preferably in the range of 175° to 400° F., and most preferably in the range of 200° to 365° F. The space velocity of the exhaust gas may be in the range of 5,000 to 50,000 $hr^{-1}$ and more preferably in the range of 10,000 to 20,000 $hr^{-1}$, although it is anticipated that a larger range will permit effective operation without an undue reduction in quality of the output gas. As used herein, the term space velocity means volume units of flow per volume units of catalyst per hour.

The catalyst absorber of the present invention absorbs the oxidized oxides so that only a small percentage, generally 10% or less of the initial oxide pollutants, pass through the system and are released. While not being bound to a particular theory, it is presently believed that the reactions which occur are as follows for each of the three pollutants, with an oxidation occurring, followed by a reaction with the carbonate such as $Na_2CO_3$:

-continued

The catalyst/absorber may be a platinum catalyst supported on alumina with an alkali or alkaline earth carbonate or bicarbonate coating thereon, the carbonate coating being lithium, sodium, potassium or calcium carbonate, and presently the preferred coating is a potassium carbonate.

The absorber, when it ceases to be effective, and specifically, when the level of pollutants emanating from the apparatus after contact with the catalyst absorber increases beyond an acceptable level, can be replaced, and the used absorber can be recharged to an effective status again. Recharging of the catalyst is accomplished by removing the spent (saturated or partially saturated) carbonate and replacing the spent carbonate with fresh unreacted carbonate.

BRIEF DESCRIPTION OF THE DRAWINGS

FIG. 1 is a schematic depiction of the catalyst absorber of the present invention.

DETAILED DESCRIPTION OF THE INVENTION

The present invention is directed to a material for removing gaseous pollutants from combustion exhaust streams, in which the material comprises an oxidation catalyst specie disposed on a high surface area support coated with an absorber material. The oxidation catalyst specie is selected from the group of noble metal elements, base metal transitional elements and combinations thereof. More particularly, the oxidation catalyst species are selected from platinum, palladium, rhodium, cobalt, nickel, iron, copper and molybdenum, and preferably, platinum and rhodium, and most preferably, platinum.

The oxidation catalyst specie concentration is 0.05 to 0.6 percent by weight of the material, and preferably is 0.1 to 0.4 percent by weight of the material, and most preferably is 0.15 to 0.3 percent by weight of the material. More than one element may be used as an oxidation catalyst specie, and under these conditions each of said elements has a concentration in the range of 0.05 to 0.6 percent by weight.

The high surface area support is made of alumina, zirconia, titania, silica or a combination of two or more of these oxides. Preferably, the high surface area support is made of alumina. The surface area of the support is in the range of 50 to 350 square meters per gram, preferably 100 to 325 square meters per gram, and more preferably 200 to 300 square meters per gram. The high surface area support may be coated on a ceramic or metal matrix structure.

The catalyst absorber may be in a shape such as a sphere, solid cylinder, hollow cylinder, star shape or wheel shape.

The absorber is coated with at least one alkali or alkaline earth compound, which can be a hydroxide compound, bicarbonate compound, or carbonate compound, or mixtures of hydroxides and/or bicarbonates and/or carbonated compounds. Preferably, the absorber comprises substantially all carbonate, and most preferably sodium carbonate, potassium carbonate or calcium carbonate. The absorber is disposed on the material at a concentration in the range of 0.5 to 20 percent by weight of the material, preferably 5.0 to 15 percent by weight of the material, and most preferably about 10% percent by weight of the material.

The process for making the novel catalyst absorber of the present invention includes applying the oxidation catalyst specie from solution. The solution is preferably a nonaqueous solution. The oxidation catalyst specie may also be applied from chloride free aqueous solution. Once applied the oxidation catalyst specie is dried after application and may be activated after application, possibly by calcining it.

After the catalyst absorber is spent or partially spent, it can be reactivated. Reactivation is accomplished by removing and replacing the spent absorber and disposing of the removed spent absorber. The spent absorber can be used as fertilizer in that it is rich in nitrogen, carbon and sulfur. Alternatively, reactivation is accomplished by decomposing components formed by the combination of pollutants with the absorber and trapping the concentrated pollution gases for disposal or use. The apparatus of the present invention supports the catalyst absorber and contacts the catalyst absorber with a combustion exhaust. It includes a means for removing spent catalyst absorber from contact with the combustion gases and at the same time moving an equivalent amount of new or regenerated catalyst absorber into contact with the combustion gas to maintain a specified outlet pollution concentration limit. The apparatus is in the shape of a wheel or carrousel, or it may be a fluid bed or two or more beds which are alternately used for absorption of pollutant gases and reactivated.

Figure 1A:
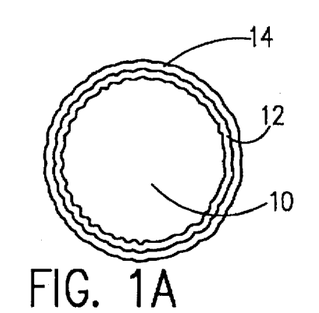
FIG. 1a is a drawing of a catalyst absorber sphere in a preferred embodiment.
Figures 1B, 3:
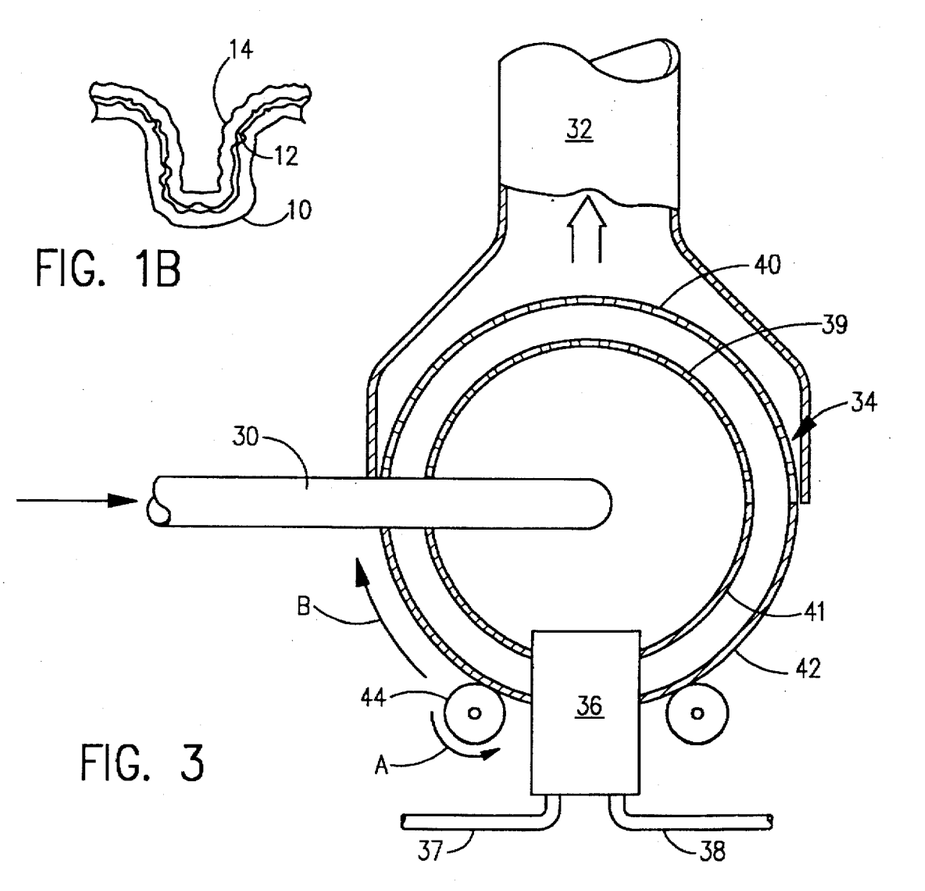
FIG. 1b is a magnified drawing of a portion of the surface of the catalyst absorber sphere of the present invention.
FIG. 3 is an illustration of a wheel apparatus for changing and regenerating the oxidation catalyst/absorber of the present invention.
Figure 1C:
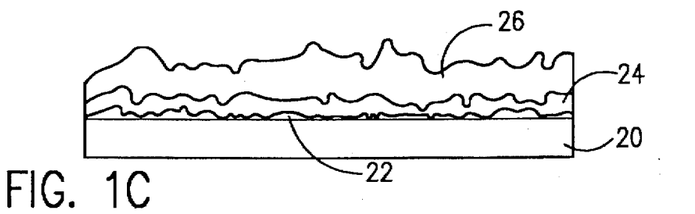
FIG. 1c is a drawing of the surface of a monolith catalyst absorber of the present invention.

As shown in FIG. 1, the catalyst absorber of the present invention can take on different configurations. FIG. 1a shows a spherical catalyst absorber made up of an alumina sphere 10 with a platinum coating 12 and a carbonate coating 14 thereon. As shown in FIG. 1b, the surface of the sphere is very irregular so that there is an extremely large surface area per gram of material as described herein. As shown in FIG. 1c, the catalyst absorber can be in the form of a monolith surface including a ceramic or stainless steel support 20, an alumina layer 22, a platinum layer 24 and a carbonate layer 26.

Figure 2:
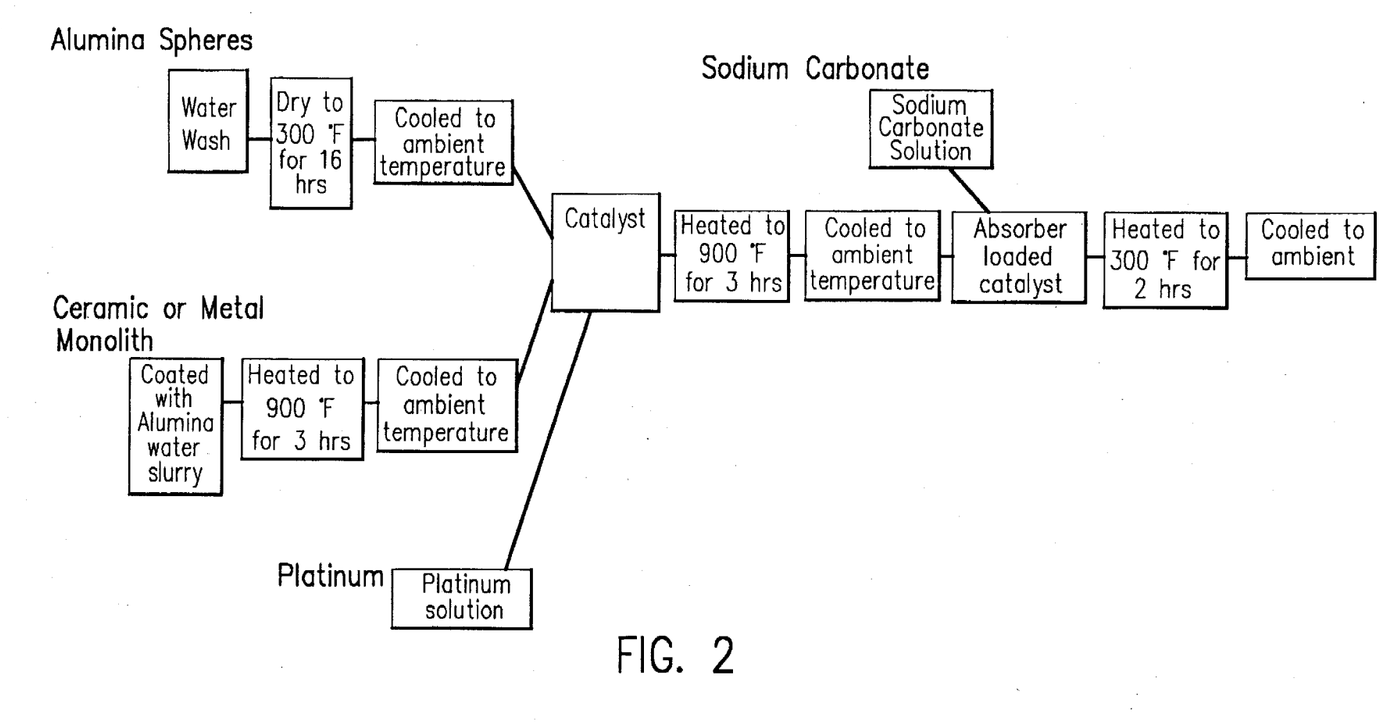
FIG. 2 is a flowchart showing the process of making the catalyst of the present invention.

The method of making the catalyst absorber is shown in FIG. 2. The catalyst/absorber of the present invention is made by starting with high surface area alumina spheres having a surface area of 50 to 350 square meters per gram, these spheres being commercially available from several sources, and preferably from La Roche Chemicals, Inc., Baton Rouge, La. The spheres are approximately ⅛ inch in diameter. It will be appreciated that other forms of supports may be used without from the spirit and scope of the present invention. The alumina spheres are washed with distilled water to remove small particles bound loosely to the surface. The spheres are then dried for about 16 hours at 300° F. to ensure that all of the cavities and interstices in the spheres are fully dried, and that the surface is free of water. The spheres are then stored in an air-tight container until ready for further processing.

A solution of Pt 2-ethylhexanoate which contained 25% Pt was added to toluene to get a concentration of Pt such that the weight of solution equal to the toluene uptake would contain sufficient Pt to give a loading of 0.23 weight percent per weight of alumina. The platinum coated spheres were then dried for 1 hour at 900° F. in air. The spheres are then cooled to approximately room temperature and stored in an air-tight container again. The platinum coated spheres are then coated with an alkali or alkaline earth carbonate or bicarbonate coating, the alkali or alkaline earth carbonate or bicarbonate being selected from lithium, sodium, potassium or calcium carbonate or bicarbonate solution, preferably, a sodium carbonate solution at a concentration of 14 percent by weight in distilled water. The water was heated to dissolve all of the sodium carbonate. The carbonate coated spheres were then dried at 300° F. for two hours. The final catalyst absorber had a coating of platinum in the amount of 0.23 weight percent added to the alumina, and 10.0 weight percent $Na_2CO_3$ added to the alumina. The spheres are then disposed in a 3×3×6 inch wire mesh basket and used as described below.

Alternatively, another form of the catalyst absorber can be made using ceramic or metal monolith supports. Tests were performed by taking a core plug of a metal monolith having approximately 300 openings per square inch, obtaining a core from the monolith of appropriate dimensions for use in the test equipment, coating the surface of the channels in the monolith with alumina from a water slurry, calcining at 900° F. or 3 hours, and cooling. This core is then coated with a platinum coating as described above with respect to the spheres and then the carbonate is applied by the method used for the spheres.

After the catalyst absorber is exhausted or saturated, it can be regenerated. A typical regeneration procedure is as follows:

1. The beads after cooling are transferred to containers approximately 7"×10"×5". The containers have closeable lids and inlet and outlet gas or drain lines.
2. Approximately 260 cubic inches of spheres are washed at 190° F. with 4 liters of demineralied water for five minutes with stirring.
3. Samples are taken as the liquid is drained off.
4. Three liters of approximately 14% sodium or potassium carbonate solution at 190° F. are added to the container.
5. The spheres are stirred and soaked for 20 minutes, or as little as 2 to 5 minutes.
6. Samples are taken as solution is drained.
7. In a 300° F. furnace the beads are dried for 45 minutes with approximately 10 scfm heated dry air flowing through the container.
8. The weighed dry beads are returned to the screen container for reuse.

As shown in FIG. 3, the catalyst absorber of the present invention can be installed in a wheel apparatus to permit contacting stack gases with the catalyst absorber and regenerating the catalyst absorber after it is saturated or partially saturated. As shown in FIG. 3, the wheel apparatus includes an inlet 30 for receiving the combustion gases and stack 32 for exhausting the treated gases, a cylindrical assembly 34 containing catalyst absorber and a regenerating unit 36 for regenerating the spent catalyst, the regenerating unit having an inlet 37 and outer 38 for replenishing fresh regeneration fluid. The inner wall 39 and outer wall 40 of a portion of the wheel adjacent the stack 32 are perforated or otherwise vented to permit passage of the gas therethrough. The inner and/or outer walls 41 and 42 of the remainder of the wheel is closed so that the exhaust gases only exhaust through the stack 32. A drive 44 is used to rotate the wheel either discretely or continuously. Arrow A designates the direction of the drive 44 rotation and arrow B indicates the direction of the wheel rotation.

Figure 4:
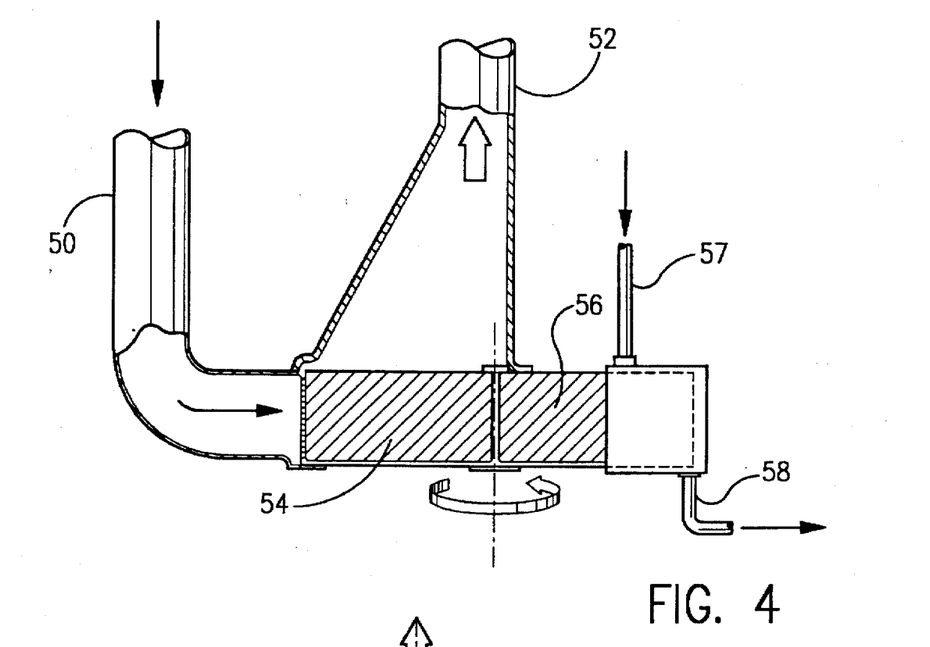
FIG. 4 is an illustration of a carousel apparatus for changing and regenerating the oxidation catalyst/absorber of the present invention.

As shown in FIG. 4, an alternative arrangement for the catalyst adsorber is disclosed, in which a carousel is used. The stack gases enter through the inlet 50 and exit through the stack 52. The catalyst absorber is inserted in line with the stack gases at 54, and when spent is retracted into the carousel at 56 and a new absorber installed. The spent catalyst absorber is then regenerated. Fresh regeneration fluid enters through inlet 57 and is remove through outlet 58.

Figure 5:
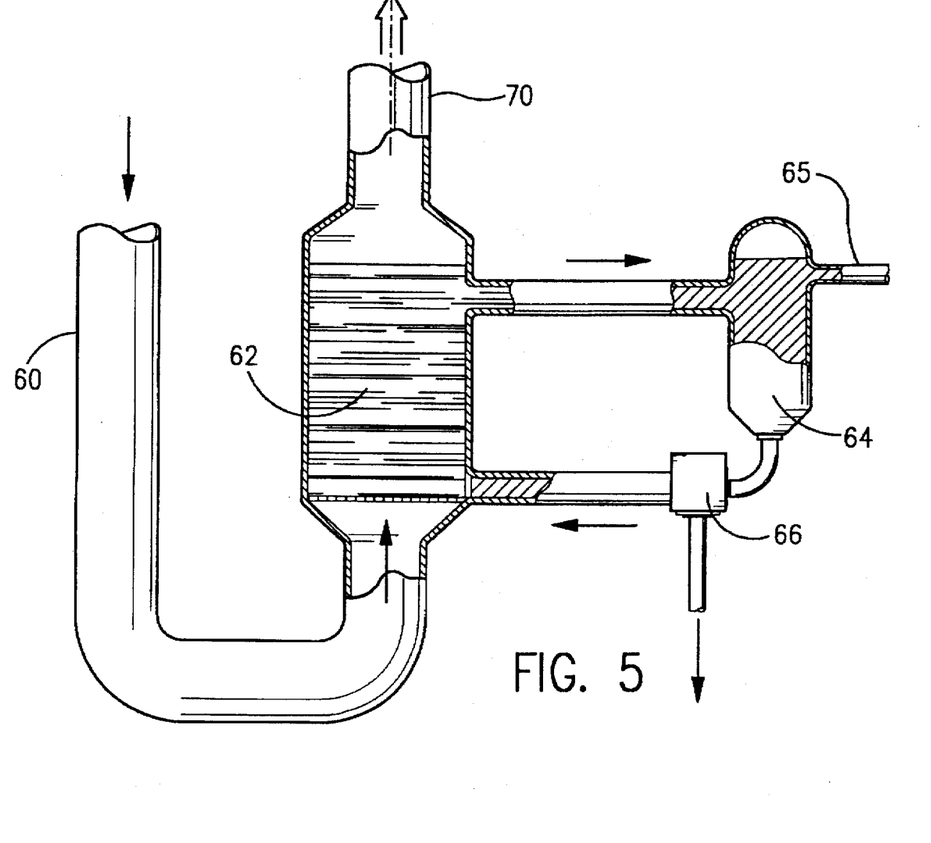
FIG. 5 is an illustration of a fluidized bed apparatus for changing and regenerating the oxidation catalyst/absorber of the present invention.

As shown in FIG. 5, a fluidized bed apparatus is disclosed. This apparatus has a combustion gas inlet 60 and stack outlet 70. There is a fluidized bed 62 in line with the gas which contains active catalyst absorber. A portion of the catalyst absorber is removed from the fluidized bed and moved to the regeneration unit 64. Regeneration fluid is sent into the regenerator at 65 and is removed by the fluid separator 66.

Figure 6:
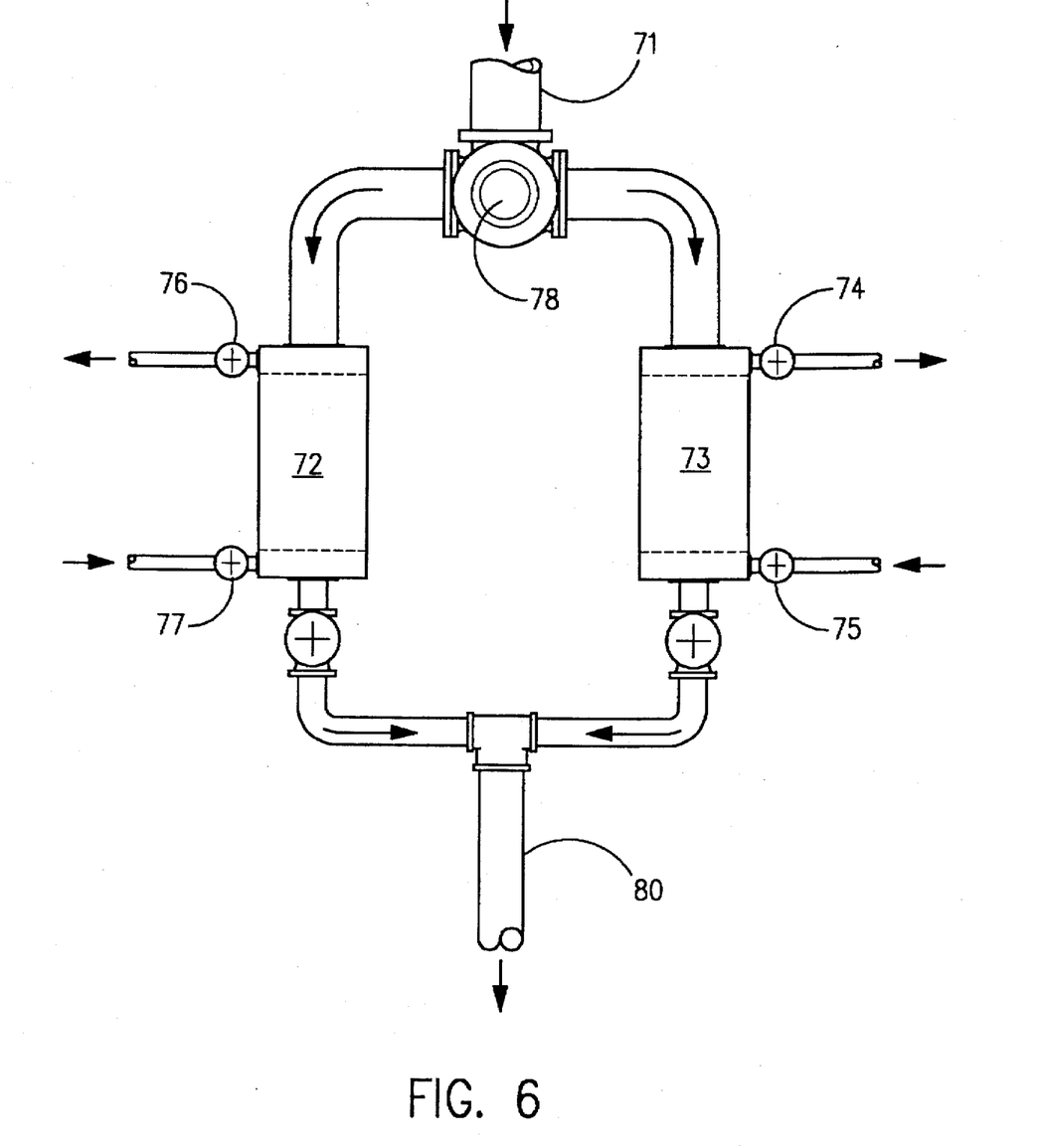
FIG. 6 is an illustration of a multiple fluidized bed apparatus for changing and regenerating the oxidation catalyst/absorber of the present invention.

As shown in FIG. 6, a multiple fluidized bed apparatus is disclosed. This apparatus has a combustion gas inlet 71 and stack outlet 80. There is a first fluidized bed 72 in line with the gas which contains active catalyst absorber. There is a second fluidized bed 73 which is being regenerated. The first fluidized bed has inlet 76 and outlet 77 with valves to permit regeneration fluid in and out. The second fluidized bed has inlet 74 and outlet 75 with valves to permit regeneration fluid in and out. Valve 78 controls whether combustion gases go to the first or second fluidized bed.

In the following examples, gas measurements were made as follows: CO was measured by a TECO model 48 infrared analyzer, $CO_2$ was measured by a Horiba $CO_2$ infrared meter and NO and $NO_2$ were measured using a TECO model #10R chemiluminescent detector with a stainless steel converter. Sulfur oxides were measured using a TECO model #43a Pulsed Fluorescence $SO_2$ Analyzer.

Examples of the performance of the present invention are set forth below.

Experiment No. 1

In each of the following experiments, the starting gas was obtained from a slip stream from the turbine exhaust from a cogeneration plant turbine. The catalyst absorber was disposed in two wire mesh baskets having a 3 inch by 3 inch by 6 inch geometry and placed in line with the slip stream in series to mimimize any edge effects and ensure that all of the slip stream comes in contact with the catalyst absorber. The space velocity of the slip stream was 18,000 per hour. The two temperatures listed indicate the temperature for the upstream first basket and the temperature for the downstream second basket. All pollutant measurements are in ppm. NOx is the total concentration of nitrogen oxide (NO) and nitrogen dioxide ($NO_2$).

Initial Starting Pollutant Levels
CO in, 10.98 ppm
NO in, 29.0 ppm
NOx in, 33.0 ppm

| Time Hours:Min. | Temp 1 (°F.) | Temp 2 (°F.) | CO out (ppm) | No out (ppm) | NOx out (ppm) |
|---|---|---|---|---|---|
| :15 | 230 | 216 | 0.36 | 3.0 | 3.0 |
| :30 | 355 | 323 | 0.18 | 3.0 | 4.0 |
| :45 | 355 | 328 | 0.20 | 3.0 | 4.0 |
| 1 hour | 354 | 329 | 0.19 | 3.0 | 5.0 |
| 1:15 | 352 | 328 | 0.20 | 3.0 | 5.0 |
| 1:30 | 351 | 328 | 0.23 | 2.5 | 6.0 |
| 1:45 | 350 | 327 | 0.25 | 3.0 | 7.0 |
| 2 hours | 348 | 325 | 0.17 | 7.0 | 8.0 |
| 2:15 | 348 | 325 | 0.17 | 7.0 | 8.0 |
| 2:30 | 348 | 325 | 0.19 | 8.0 | 10.0 |
| 2:45 | 348 | 325 | 0.18 | 9.0 | 10.0 |
| 3 hours | 348 | 325 | 0.18 | 10.0 | 11.0 |
| 3:15 | 347 | 325 | 0.17 | 11.0 | 12.0 |
| 3:30 | 346 | 323 | 0.17 | 11.0 | 12.0 |
| 3:45 | 346 | 322 | 0.18 | 12.0 | 13.0 |

Experiment No. 1-a

The catalyst absorber was regenerated, and the experiment was run again under the same conditions, using the regenerated catalyst absorber.

Initial Starting Pollutant Levels
CO in, 9.91 ppm
NO in, 30.0 ppm
NOx in, 36.0 ppm

| Time Hours:Min. | Temp 1 (°F.) | Temp 2 (°F.) | CO out (ppm) | NO out (ppm) | NOx out (ppm) |
|---|---|---|---|---|---|
| :15 | 135 | 162 | 2.49 | 16.0 | 16.0 |
| :30 | 365 | 160 | .13 | 5.0 | 5.0 |
| :45 | 363 | 351 | .05 | 2.0 | 2.0 |
| 1 hour | 363 | 353 | .05 | 2.5 | 2.5 |
| 1:15 | 362 | 353 | .08 | 4.0 | 4.0 |
| 1:30 | 362 | 352 | .05 | 4.5 | 5.0 |
| 1:45 | 362 | 354 | .07 | 5.5 | 6.0 |
| 2 hours | 362 | 354 | .07 | 6.0 | 7.0 |
| 2:15 | 362 | 354 | .07 | 7.0 | 8.0 |
| 2:30 | 361 | 353 | .06 | 7.5 | 8.5 |
| 2:45 | 362 | 354 | .09 | 8.5 | 9.5 |
| 3 hours | 362 | 354 | .08 | 9.0 | 10.0 |
| 3:15 | 362 | 354 | .08 | 9.0 | 10.5 |
| 3:30 | 363 | 355 | .08 | 10.0 | 11.5 |
| 3:45 | 363 | 356 | .08 | 10.0 | 12.0 |
| 4 hours | 264 | 356 | .07 | 10.5 | 12.5 |

It is believed that the first reading at 15 minutes showed high pollution level because the temperature of the catalyst absorber was below the necessary temperature for oxidation.

Experiment No. 1-b

The catalyst absorber was regenerated a second time, and the experiment was run again under the same conditions, using the twice regenerated catalyst absorber.

Initial Starting Pollutant Levels
CO in, 13.16 ppm
NO in, 26.0 ppm
NOx in, 32.5 ppm

| Time Hours:Min. | Temp 1 (°F.) | Temp 2 (°F.) | CO out (ppm) | NO out (ppm) | Nox out (ppm) |
|---|---|---|---|---|---|
| :15 | 133 | 134 | 0.2 | 23.0 | 23.0 |
| :30 | 296 | 139 | 3.02 | 16.0 | 16.0 |
| :45 | 313 | 142 | 0.43 | 7.5 | 7.5 |
| 1 hour | 296 | 296 | 0.30 | 6.0 | 6.0 |
| 1:15 | 285 | 285 | 0.34 | 7.0 | 7.0 |
| 1:30 | 279 | 278 | 0.37 | 8.5 | 8.5 |
| 1:45 | 282 | 273 | 0.40 | 10.0 | 10.0 |
| 2 hours | 304 | 290 | 0.30 | 9.5 | 9.5 |
| 2:15 | 320 | 308 | 0.25 | 9.5 | 10.0 |
| 2:30 | 330 | 319 | 0.22 | 10.0 | 11.0 |
| 2:45 | 339 | 329 | 0.20 | 10.5 | 12.0 |
| 3 hours | 343 | 334 | 0.20 | 11.5 | 12.5 |
| 3:15 | 347 | 338 | 0.22 | 12.0 | 14.0 |

Experiment No. 1-c

The catalyst absorber was regenerated again, and the experiment was run again under the same conditions, using the three time regenerated catalyst absorber.

Initial Starting Pollutant Levels
CO in, 12.13 ppm
NO in, 28.0 ppm
NOx in, 34.0 ppm

| Time Hours:Min. | Temp I (°F.) | Temp 2 (°F.) | CU out (ppm) | NO out (ppm) | NOx out (ppm) |
|---|---|---|---|---|---|
| :15 | 142 | 155 | 7.61 | 20. | 20.0 |
| :30 | 352 | 195 | 0.30 | 3.0 | 3.0 |
| :50 | 350 | 342 | 0.22 | 2.5 | 2.5 |
| 1 hour | 351 | 342 | 0.23 | 3.0 | 3.5 |
| 1:15 | 351 | 343 | 0.24 | 4.0 | 4.5 |
| 1:30 | 351 | 345 | 0.24 | 5.0 | 5.5 |
| 1:45 | 351 | 344 | 0.27 | 6.0 | 6.5 |
| 2 hours | 352 | 345 | 0.24 | 6.5 | 7.5 |
| 2:15 | 351 | 346 | 0.24 | 8.0 | 9.0 |
| 2:30 | 351 | 345 | 0.23 | 8.0 | 9.0 |
| 2:45 | 351 | 345 | 0.30 | 9.0 | 10.0 |
| 3 hours | 350 | 343 | 0.37 | 9.5 | 11.0 |
| 3:15 | 350 | 342 | 0.28 | 10.0 | 12.0 |
| 3:30 | 348 | 341 | 0.30 | 11.0 | 12.0 |
| 3:45 | 348 | 341 | 0.30 | 12.0 | 13.5 |

Experiment No. 1-d

The catalyst absorber was regenerated again, and the experiment was run again under the same conditions, using the four time regenerated catalyst absorber.

Initial Starting Pollutant Levels
CO in, 13.6 ppm
NO in, 28.0 ppm
NOx in, 34.0 ppm

| Time Hours:Min. | Temp I (°F.) | Temp 2 (°F.) | CO out (ppm) | NO out (ppm) | NOx out (ppm) |
|---|---|---|---|---|---|
| :15 | 132 | 132 | 10.28 | 22.0 | 23.0 |
| :30 | 353 | 143 | 1.22 | 8.0 | 8.0 |
| :45 | 351 | 259 | 0.45 | 4.0 | 4.5 |
| 1 hour | 350 | 338 | 0.42 | 4.0 | 4.5 |
| 1:15 | 349 | 338 | 0.43 | 5.0 | 5.5 |
| 1:30 | 349 | 338 | 0.41 | 6.0 | 6.5 |

-continued

Initial Starting Pollutant Levels
CO in, 13.6 ppm
NO in, 28.0 ppm
NOx in, 34.0 ppm

| Time Hours:Min. | Temp 1 (°F.) | Temp 2 (°F.) | CO out (ppm) | NO out (ppm) | NOx out (ppm) |
|---|---|---|---|---|---|
| 1:45 | 349 | 339 | 0.41 | 7.0 | 7.5 |
| 2 hours | 349 | 339 | 0.42 | 8.0 | 9.0 |
| 2:15 | 348 | 339 | 0.46 | 8.5 | 9.5 |
| 2:30 | 349 | 339 | 0.45 | 9.5 | 10.5 |
| 2:45 | 349 | 339 | 0.49 | 10.0 | 11.5 |
| 3 hours | 349 | 339 | 0.48 | 10.5 | 12.0 |
| 3:15 | 350 | 340 | 0.55 | 11.0 | 13.0 |

Experiment No. 2

The conditions for this series of experiments was the same as those for Experiment No. 1. This series was begun with a new catalyst absorber of the same type and configuration as described above for Experiment No. 1.

Initial Starting Pollutant Levels
CO in, 10.98 ppm
NO in, 29.0 ppm
NOx in, 33.0 ppm

| Time Hours:Min. | Temp 1 (°F.) | Temp 2 (°F.) | CO out (ppm) | NO out (ppm) | NOx out (ppm) |
|---|---|---|---|---|---|
| :15 | 345 | 225 | 0.20 | 2.0 | 2.0 |
| :30 | 348 | 308 | 0.19 | 2.0 | 2.0 |
| :45 | 350 | 315 | 0.22 | 2.0 | 2.0 |
| 1 hour | 350 | 317 | 0.24 | 2.0 | 2.5 |
| 1:15 | 351 | 317 | 0.23 | 2.5 | 2.5 |
| 1.30 | 351 | 318 | 0.23 | 3.0 | 3.0 |
| 1:45 | 351 | 317 | 0.24 | 3.5 | 4.0 |
| 2 ours | 351 | 317 | 0.26 | 5.0 | 7.0 |
| 2:15 | 350 | 318 | 0.24 | 6.0 | 8.0 |
| 2.30 | 351 | 319 | 0.25 | 8.0 | 10.0 |
| 2:45 | 351 | 320 | 0.23 | 10.0 | 11.0 |
| 3 hours | 352 | 320 | 0.26 | 10.0 | 12.0 |
| 3:15 | 352 | 320 | 0.22 | 11.0 | 12.0 |
| 3:30 | 353 | 321 | 0.26 | 11.0 | 13.0 |

Experiment No. 2-a

The catalyst absorber was regenerated, and the experiment was run again under the same conditions, using the regenerated catalyst absorber.

Initial Starting Pollutant Levels
CO in, 11 ppm
NO in, 29 PPM
NOx in, 33 ppm

| Time Hours:Min. | Temp 1 (°F.) | Temp 2 (°F.) | CO out (ppm) | N out (ppm) | NOx out (ppm) |
|---|---|---|---|---|---|
| :15 | 144 | 142 | 7.75 | 20.0 | 20.0 |
| :30 | 374 | 142 | 0.39 | 5.0 | 5.0 |
| :45 | 372 | 358 | 0.17 | 2.0 | 2.0 |
| 1 hour | 371 | 362 | 0.15 | 2.0 | 2.0 |
| 1:15 | 370 | 363 | 0.17 | 3.0 | 3.5 |
| 1:30 | 370 | 363 | 0.17 | 4.0 | 4.5 |
| 1:45 | 368 | 361 | 0.18 | 4.5 | 5.0 |
| 2 hours | 367 | 369 | 0.13 | 5.0 | 6.0 |
| 2:15 | 367 | 360 | 0.15 | 6.5 | 7.5 |
| 2:30 | 366 | 358 | 0.17 | 7.5 | 8.5 |
| 2:45 | 366 | 359 | 0.18 | 8.0 | 9.0 |

-continued

Initial Starting Pollutant Levels
CO in, 11 ppm
NO in, 29 PPM
NOx in, 33 ppm

| Time Hours:Min. | Temp 1 (°F.) | Temp 2 (°F.) | CO out (ppm) | N out (ppm) | NOx out (ppm) |
|---|---|---|---|---|---|
| 3 hours | 366 | 358 | 0.14 | 9.0 | 10.0 |
| 3:15 | 366 | 358 | 0.17 | 10.0 | 11.0 |
| 3:30 | 365 | 359 | 0.17 | 10.0 | 11.5 |
| 3.45 | 363 | 356 | 0.18 | 10.5 | 12.0 |
| 4 hours | 362 | 354 | 0.17 | 11.5 | 13.0 |

Experiment No. 2-b

The catalyst absorber was regenerated again, and the experiment was run again under the same conditions, using the twice regenerated catalyst absorber.

Initial Starting Pollutant Levels
CO in, 11 ppm
NO in, 29 ppm
NOx in, 33 ppm

| Time Hours:Min. | Temp 1 (°F.) | Temp 2 (°F.) | CO out (ppm) | NO out (ppm) | NOx out (ppm) |
|---|---|---|---|---|---|
| :15 | 186 | 142 | 5.53 | 18.0 | 18.0 |
| :30 | 279 | 144 | 2.65 | 12.0 | 13.0 |
| :45 | 275 | 255 | 0.85 | 7.0 | 7.0 |
| 1 hour | 271 | 254 | 0.65 | 7.0 | 7.0 |
| 1:15 | 267 | 253 | 0.77 | 9.0 | 9.0 |
| 1:30 | 274 | 255 | 0.78 | 10.0 | 10.0 |
| 1:45 | 283 | 262 | 0.73 | 11.0 | 11.0 |
| 2 hours | 284 | 266 | 0.68 | 11.0 | 11.5 |
| 2:15 | 282 | 266 | 0.68 | 13.0 | 13.0 |

Experiment No. 2-c

The catalyst absorber was regenerated again, and the experiment was run again under the same conditions, using the three time regenerated catalyst absorber.

Initial Starting Pollutant Levels
CO in, 9.05 ppm
NO in, 26.0 ppm
NOx in, 32.0 ppm

| Time Hours:Min. | Temp 1 (°F.) | Temp 2 (°F.) | CO out (ppm) | NO out (ppm) | NOx out (ppm) |
|---|---|---|---|---|---|
| :15 | 354 | 142 | 1.06 | 7.0 | 7.0 |
| :30 | 356 | 150 | 0.49 | 2.0 | 2.0 |
| :45 | 354 | 338 | 0.41 | 2.0 | 2.0 |
| 1 hour | 351 | 337 | 0.43 | 2.0 | 3.0 |
| 1:15 | 352 | 338 | 0.45 | 3.0 | 5.0 |
| 1:30 | 352 | 339 | 0.50 | 6.0 | 7.0 |
| 1:45 | 352 | 337 | 0.50 | 7.0 | 8.0 |
| 2 hours | 351 | 338 | 0.50 | 8.0 | 9.0 |
| 2:15 | 350 | 336 | 0.49 | 8.5 | 9.5 |
| 2:30 | 349 | 335 | 0.50 | 9.0 | 10.0 |
| 2:45 | 348 | 334 | 0.56 | 10.0 | 11.0 |
| 3 hours | 348 | 334 | 0.58 | 11.0 | 12.0 |

Experiment 3—First Run

This experiment was run using a monolith core catalyst in a laboratory set up under the conditions set forth below. The space velocity was 10,000 hr$^{-1}$. The initial starting pollutant levels are set out at time zero (0) minutes. Only one catalyst absorber unit was used and the temperatures was measured just before the catalyst absorber.

| Time (Minutes) | Temp (°F.) | CO (ppm) | NOx (ppm) | NO (ppm) | Sulfur (SO$_2$) (ppm) |
|---|---|---|---|---|---|
| Input Concentrations | 351 | 18.0 | 33.0 | 29.0 | 0.5 |
| 1 | 405 | 0 | 1.0 | | 0.5 |
| 2 | 415 | | 1.0 | 0.5 | 0.35 |
| 5 | 420 | | 0.75 | | 0.059 |
| 10 | 480 | | 0.45 | | 0.004 |
| 20 | 401 | 0 | 0.4 | | 0 |
| 32 | 380 | | 2.4 | | 0.004 |
| 42 | 408 | | 2.3 | | 0.007 |
| 48 | 360 | | 1.5 | | 0.001 |
| 50 | 344 | | 1.85 | | 0.002 |
| 64 | 296 | | 5.2 | 4.2 | 0.016 |
| 75 | 291 | | 8.6 | 7.1 | 0.023 |
| 85 | 291 | | 9.0 | | 0.037 |

Experiment 3—Second Run

The catalyst absorber was regenerated, and the experiment was run again under the same conditions, using the regenerated catalyst absorber.

| Time (Minutes) | Temp (°F.) | CO (ppm) | NOx (ppm) | NO (ppm) | Sulfur (SO$_2$) (ppm) |
|---|---|---|---|---|---|
| Input Concentrations | | 20.0 | 34.0 | 31.0 | 0.51 |
| 0.5 | 378 | 0.1 | 1.8 | | 0.08 |
| 1 | 369 | 0.1 | 1.8 | | 0.02 |
| 2 | 343 | 0.1 | 1.75 | 1.55 | 0.32 |
| 3 | 326 | 0.1 | 1.75 | 1.6 | 0.19 |
| 6 | 300 | 0.1 | 2.0 | 1.85 | 0.05 |
| 10 | 286 | 0.1 | 2.6 | 2.6 | 0.025 |
| 12 | 284 | 0.1 | 3.0 | | 0.021 |
| 21 | 287 | 0.1 | 5.0 | | 0.021 |
| 25 | 288 | 0.1 | 6.2 | 6.2 | 0.024 |
| 30 | 291 | 0.1 | 9.0 | 7.9 | 0.02 |
| 47 | 300 | 0.1 | 13.5 | 12.5 | 0.05 |

Experiment No. 4

In the following experiment, the starting gas was obtained from a slip stream from the turbine exhaust from a cogeneration plant turbine, as with Experiments 1 and 2. The catalyst has the same configuration as in Experiments 1 and 2. The space velocity of the slip stream was 18,000 hr$^{-1}$. The temperature for the upstream first basket was 330° F. and 300° F. for the downstream second basket. All pollutant measurements are in ppm.

| Time (Minutes) | CO (ppm) | NOx (ppm) | NO (ppm) | NO$_2$ (ppm) |
|---|---|---|---|---|
| Input Concentrations | 20.0 | 33 | 27 | 6 |
| 0 | 0 | 1.5 | 1.5 | 0 |
| .5 | 0 | 1.5 | 1.5 | 0 |
| 1.5 | 0 | 5 | 5 | 10 |
| 3 | 0 | 10 | 10 | 0 |

Apparatus

To apply the catalyst absorber to the continuous reduction of gaseous pollutants in stack gases an apparatus is required. The catalyst absorber is moved into contact with the stack gas and remains there until the outlet levels of carbon monoxide, nitrogen oxides and/or sulfur oxides exceed some specified low concentrations. The catalyst absorber is then moved out contact with the stack gases for regeneration while being replaced with fresh or previously regenerated catalyst absorber. The regenerated catalyst absorber is cycled back into contact with the stack gases in sequence.

The apparatus to apply the catalyst absorber of the present invention can be in the form of a wheel or carousel, a portion of which is in contact with the stack gas and a portion of which is outside of contact with the stack gas. In this case, the catalyst absorber is mounted to the wheel and moves in and out of the stack gas stream as the wheel rotates. The apparatus may alternatively be a moving continuous belt with the catalyst absorber being disposed on the belt. Alternatively, a fluidized bed of the alumina spheres for of the catalyst absorbed can be located in the stack gas stream. In this embodiment a small fraction of the catalyst absorber, for example, one percent per minute, is continuously removed, regenerated and returned. Any other apparatus could be used to accomplish the goals specified herein, the choice of such apparatus depending upon the individual applications.

It would be obvious to a person of ordinary skill in the art that a number of changes and modifications can be made to the presently described process, apparatus and methods without departing from the spirit and scope of the present invention. It is contemplated that the present invention is encompassed by the claims as presented herein and by all variations thereof coming within the scope of equivalents accorded thereto.

What is claimed is:

1. A process of removing gaseous pollutants from combustion stack gases comprising contacting a catalyst absorber, comprising an oxidation catalyst specie selected from platinum, palladium, rhodium, cobalt, nickel, iron, copper, molybdenum or combinations thereof disposed on a high surface area support, said oxidation catalytic specie being intimately and entirely coated with an absorber selected from a hydroxide, carbonate, bicarbonate or mixture thereof of an alkali or alkaline earth or mixtures thereof wherein said oxidation catalyst specie and absorber are present in discrete layers, with said combustion stack gas containing said pollutants such as carbon monoxide, sulfur oxides and nitrogen oxides at a space velocity of 5,000 to 50,000 hr$^{-1}$, and at a temperature above 150° F. until the catalyst absorber is at least partially saturated.

2. The process of claim 1 where the catalyst absorber is reactivated after at least partial saturation.

3. The process of claim 2 where the catalyst absorber reactivation is accomplished by removing and replacing the spent absorber and disposing the removed spent absorber.

4. The process of claim 2 where the reactivation is accomplished by decomposing components formed by the combination of pollutants with the absorber and trapping the concentrated pollution gases for disposal or use.

5. The process of claim 2 where the reactivated catalyst absorber is recycled to the combustion exhaust stream for reuse.

6. The process according to claim 1 wherein said high surface area support is coated on a ceramic or metal matrix structure.

7. The process according to claim 6 wherein said ceramic or metal matrix structure comprises monolith.

8. The process according to claim 7 wherein said matrix structure comprises a metal monolith.

9. The process according to claim 6 wherein said high surface area support comprises alumina.

10. The process according to claim 9 wherein said oxidation catalyst specie comprises Pt and said absorber comprises carbonate.

11. The process of claim 10 wherein said temperature is in the range of 200° F. to 400° F.

12. The process of claim 11 wherein said temperature is in the range of 300° F. to 365° F.

13. The process of claim 11 wherein said platinum is disposed on said catalyst in an amount of about 0.23 weight percent of the weight of the alumina.

14. The process of claim 11 wherein said carbonate is sodium carbonate and is disposed on said catalyst in an amount of about 10.0 weight percent of the weight of the alumina.

15. The process of claim 11 wherein the catalyst absorber is comprised of alumina spheres having a surface area selected from 50 to 350 square meters per gram.

16. The process of claim 11 wherein said catalyst absorber comprises a plurality of alumina spheres disposed in a mesh container.

17. The process of claim 11 wherein said catalyst absorber is regenerated after it is exhausted.

18. The process of claim 11 comprising the steps of removing the absorber from the gas stream and providing a new absorber when the level of said gaseous pollutants increases.

19. The process according to claim 1 wherein the absorber consists essentially of potassium.

20. The process according to claim 1 wherein said absorber coating is contiguous to said oxide catalyst specie.

21. The process according to claim 1 wherein said oxidation catalyst specie is contiguous to said support.

22. The process of claim 1 wherein the oxidation catalyst specie is platinum.

23. The process of claim 1 wherein the oxidation catalyst specie concentration is 0.05 to 0.6 percent by weight of the catalyst absorber.

24. The process of claim 23 wherein the oxidation catalyst specie concentration is 0.1 to 0.4 percent by weight of the catalyst absorber.

25. The process of claim 24 wherein the oxidation catalyst specie concentration is 0.15 to 0.3 percent by weight of the catalyst absorber.

26. The process of claim 1 wherein more than one element is used as an oxidation catalyst specie and wherein each of said elements has a concentration in the range of 0.05 to 0.6 percent by weight.

27. The process of claim 1 wherein the high surface area support comprises alumina, zirconia, titania, silica or a combination of two or more of these oxides.

28. The process of claim 27 wherein the high surface area support comprises alumina.

29. The process of claim 1 wherein the surface area of the support is 50 to 350 square meters per gram.

30. The process of claim 29 wherein the surface area of the support is 100 to 325 square meters per gram.

31. The process of claim 30 wherein the surface area of the support is 200 to 300 square meters per gram.

32. The process of claim 1 wherein the absorber comprises an hydroxide compound.

33. The process of claim 1 wherein the absorber comprises a bicarbonate compound.

34. The process of claim 1 wherein the absorber comprises a carbonate compound.

35. The process of claim 34 wherein the absorber consists essentially of carbonate.

36. The process of claim 35 wherein the absorber consists essentially of sodium carbonate.

37. The process of claim 35 wherein the absorber consists essentially of potassium carbonate.

38. The process of claim 35 wherein the absorber is substantially all calcium carbonate.

39. The process of claim 1 wherein the absorber comprises mixtures of hydroxides and/or bicarbonates and/or carbonated compounds.

40. The process of claim 1 wherein the absorber is disposed on said catalyst absorber at a concentration in the range of 0.5 to 20 percent by weight of the catalyst absorber.

41. The process of claim 40 wherein the absorber concentration is 5.0 to 15 percent by weight of the catalyst absorber.

42. The process of claim 40 wherein the absorber concentration is about 10 percent by weight of the catalyst absorber.

43. The process of claim 1 wherein the absorber comprises an alkali metal compound.

44. The process of claim 1 wherein the absorber comprises an alkaline earth metal compound.

* * * * *